(12) United States Patent
Bae et al.

(10) Patent No.: US 11,168,785 B1
(45) Date of Patent: Nov. 9, 2021

(54) HYDRAULIC PRESSURE CONTROL METHOD FOR TRANSMISSION

(71) Applicants: Hyundai Motor Company, Seoul (KR); Kia Motors Corporation, Seoul (KR)

(72) Inventors: Bong Uk Bae, Daegu (KR); Sung Sik Choi, Hwaseong-si (KR); Kyung Moo Lee, Yongin-si (KR); Ki Bum Kim, Seoul (KR); Seong Min Son, Pohang-si (KR); Seul Chan Park, Gwangmyeong-si (KR); Se Hwan Jo, Bucheon-si (KR); Min Jae Chai, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/038,726

(22) Filed: Sep. 30, 2020

(30) Foreign Application Priority Data

Jun. 26, 2020 (KR) .......................... 10-2020-0078683

(51) Int. Cl.
*F16H 59/70* (2006.01)
*F16H 59/72* (2006.01)
*F16H 61/02* (2006.01)
*F16H 59/68* (2006.01)

(52) U.S. Cl.
CPC ............. *F16H 59/72* (2013.01); *F16H 59/70* (2013.01); *F16H 61/0265* (2013.01); *F16H 61/0276* (2013.01); *F16H 2059/683* (2013.01); *F16H 2059/6823* (2013.01); *F16H 2059/708* (2013.01)

(58) Field of Classification Search
CPC .. F16H 59/70; F16H 59/72; F16H 2059/6823; F16H 2059/683; F16H 2059/708; F16H 61/0265; F16H 61/0276; F16H 61/0021
See application file for complete search history.

(56) References Cited

U.S. PATENT DOCUMENTS

| | | | | |
|---|---|---|---|---|
| 5,222,417 A | * | 6/1993 | Sato | ..................... F16H 61/0021 474/28 |
| 5,582,558 A | * | 12/1996 | Palmeri | ................. B60W 10/06 477/109 |
| 2011/0157758 A1 | * | 6/2011 | Benson | ................. F16H 61/061 361/160 |
| 2019/0227579 A1 | | 7/2019 | Ishii et al. | |
| 2020/0240516 A1 | * | 7/2020 | Matsui | .............. F16H 61/66259 |

FOREIGN PATENT DOCUMENTS

| KR | 101480745 B1 | 1/2015 |
|---|---|---|
| WO | 2018012357 A1 | 1/2018 |

* cited by examiner

*Primary Examiner* — Edwin A Young
(74) *Attorney, Agent, or Firm* — Slater Matsil, LLP

(57) ABSTRACT

A hydraulic pressure control method for a transmission includes determining whether a current shift range is among a plurality of shift ranges, setting a dither frequency of a pressure control solenoid valve of a hydraulic circuit for the transmission to a predetermined first frequency when the current shift range is a predetermined first range, and setting the dither frequency of the pressure control solenoid valve to a predetermined second frequency when the current shift range is a shift range other than the first range.

16 Claims, 3 Drawing Sheets

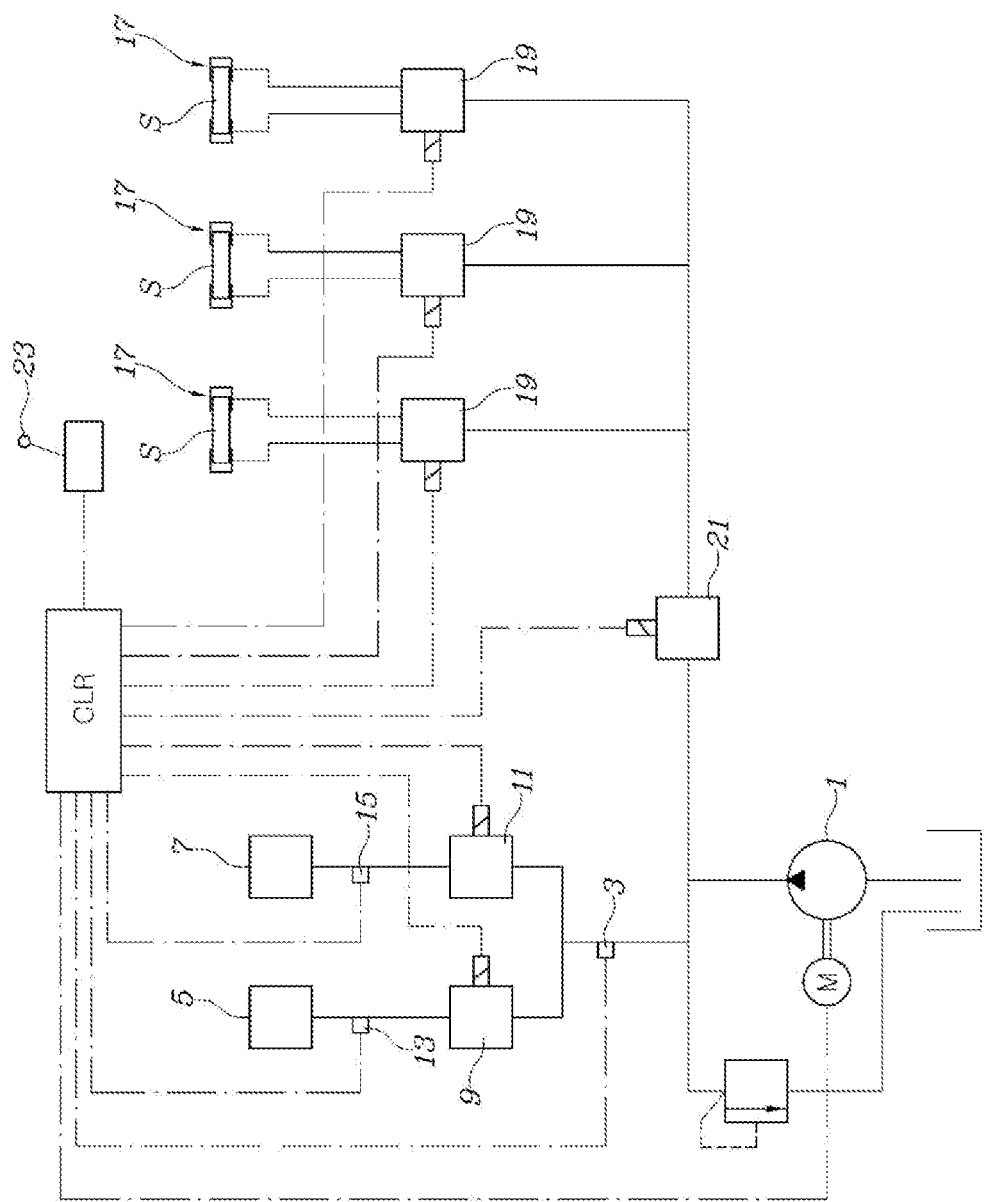
[FIG. 1]

[FIG. 2]
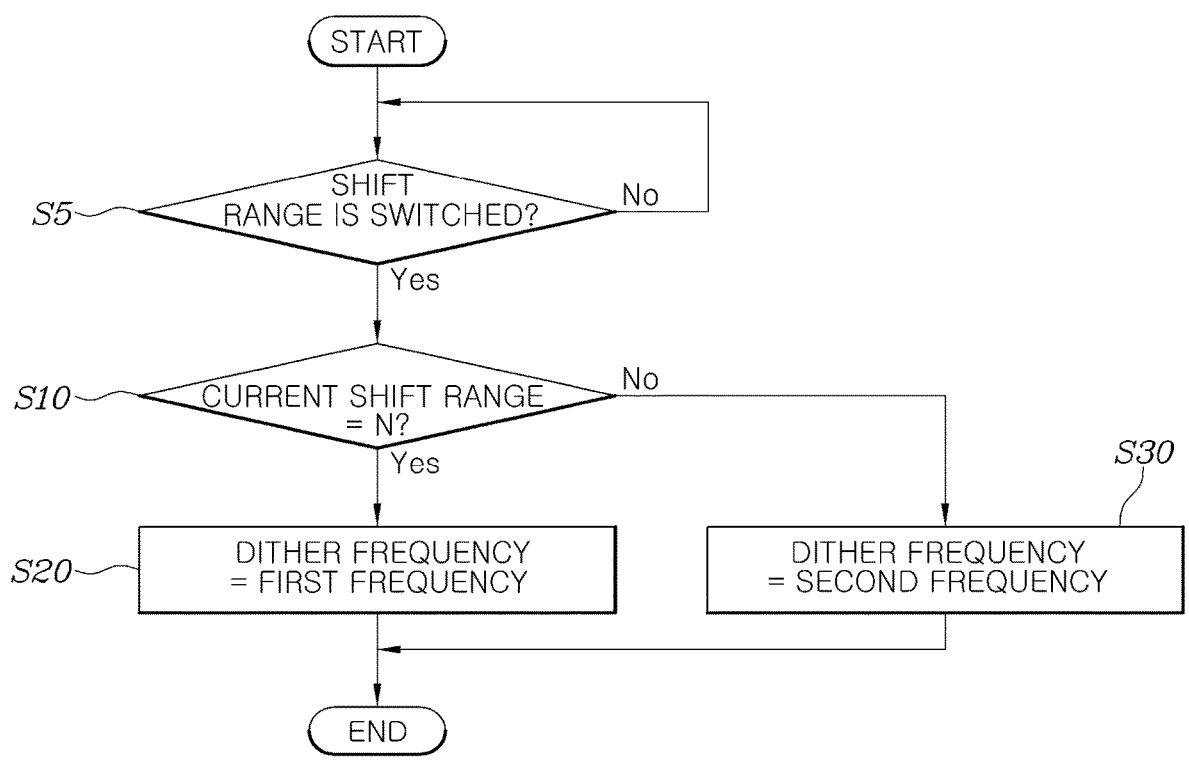

[FIG. 3]

| OIL TEMPERATURE (°C) | N RANGE (FIRST FREQUENCY) | RANGE OTHER THAN N (SECOND FREQUENCY) |
|---|---|---|
| −35 | A1 | B1 |
| −20 | A2 | B2 |
| −10 | A3 | B3 |
| 0 | A4 | B4 |
| 30 | A5 | B5 |
| 60 | A6 | B6 |
| 90 | A7 | B7 |
| 120 | A8 | B8 |

HYDRAULIC PRESSURE CONTROL METHOD FOR TRANSMISSION

CROSS-REFERENCE TO RELATED APPLICATIONS

This application claims the benefit of Korean Patent Application No. 10-2020-0078683, filed on Jun. 26, 2020, which application is hereby incorporated herein by reference.

TECHNICAL FIELD

The present disclosure relates to a hydraulic control of a transmission mounted on a vehicle.

BACKGROUND

A transmission for a vehicle is configured to be shifted by controlling the hydraulic pressure with a solenoid valve to drive actuators.

A dual clutch transmission (DCT) may be configured to independently receive power from two clutches, respectively to shift and output a gear with a plurality of shift ratios using a plurality of gear actuators, and has a hydraulic circuit including a plurality of solenoid valves to control the gear actuators by hydraulic pressure.

A variable force solenoid (VFS) may be used as the solenoid valve.

The foregoing explained as the background is intended merely to aid in the understanding of the background of the present disclosure, and is not intended to mean that the present disclosure falls within the purview of the related art that is already known to those skilled in the art.

SUMMARY

The present disclosure relates to a hydraulic control of a transmission mounted on a vehicle.

An embodiment of the present disclosure provides a hydraulic pressure control method for a transmission, which varies a control of a pressure control solenoid valve of a hydraulic circuit according to a shift range of a transmission, thereby securing a smooth operability of the pressure control solenoid valve even while preventing the line pressure pulsation of the hydraulic circuit.

A hydraulic pressure control method for a transmission according to embodiments of the present disclosure includes confirming a current shift range among a plurality of shift ranges, setting a dither frequency of a pressure control solenoid valve of a hydraulic circuit for a transmission to a predetermined first frequency, if the current shift range is a predetermined first range, and setting the dither frequency of the pressure control solenoid valve to a predetermined second frequency, if the current shift range is a shift range other than the first range.

The first range may be an N range indicating a neutral state of the transmission, and the first frequency may be a frequency lower than the second frequency.

The first frequency and the second frequency may be set to different values according to oil temperatures of the transmission, respectively.

The confirming of the current shift range may be performed when the shift range is switched by a shift lever.

The transmission may be a wet DCT controlling two clutches with hydraulic pressure, and the pressure control solenoid valve may be configured to receive line pressure to provide the hydraulic pressure adjusted by a flow rate control solenoid valve for driving a gear actuator of the wet DCT.

In addition, a hydraulic pressure control method for a transmission according to embodiments of the present disclosure includes confirming whether a shift range selected by an operation of a shift lever is an N range, and switching a dither frequency of a pressure control solenoid valve of a transmission to a frequency lower than a frequency in a previous shift range, if the selected shift range is the N range.

The dither frequency of the pressure control solenoid valve may be set to be relatively high as oil temperature of the transmission is low.

Embodiments of the present disclosure may vary the control of the pressure control solenoid valve of the hydraulic circuit according to the shift range of the transmission, thereby securing the smooth operability of the pressure control solenoid valve even while preventing the line pressure pulsation of the hydraulic circuit to secure the control robustness of the hydraulic circuit.

BRIEF DESCRIPTION OF THE DRAWINGS

The above and other objects, features and other advantages of embodiments of the present disclosure will be more clearly understood from the following detailed description when taken in conjunction with the accompanying drawings, in which:

FIG. 1 is a diagram illustrating a hydraulic circuit of a transmission to which embodiments of the present disclosure may be applied;

FIG. 2 is a flowchart illustrating an exemplary embodiment of a hydraulic pressure control method for a transmission according to embodiments of the present disclosure; and FIG. 3 is a diagram illustrating a configuration of a frequency map which may be used for the hydraulic pressure control method for the transmission according to embodiments of the present disclosure.

DETAILED DESCRIPTION OF ILLUSTRATIVE EMBODIMENTS

FIG. 1 is a block diagram illustrating a hydraulic circuit of a transmission to which embodiments of the present disclosure may be applied, in which when oil is pumped by a hydraulic pump 1 driven by a motor M, a controller CLR forms a line pressure by feedback-controlling the motor M while sensing the line pressure with a line pressure sensor 3.

The controller CLR may adjust the line pressures with a first clutch solenoid valve 9 and a second clutch solenoid valve 11, to supply the adjusted line pressures to a first clutch 5 and a second clutch 7 respectively, in order to control the first clutch 5 and the second clutch 7 received from a power source such as an engine.

Since the controller CLR is configured to receive a signal of a first clutch pressure sensor 13 to sense the pressure provided to the first clutch 5, and to receive a signal of a second clutch pressure sensor 15 to sense the pressure provided to the second clutch 7, the controller CLR may feedback-control the first clutch solenoid valve 9 and the second clutch solenoid valve 11, thereby precisely controlling the hydraulic pressures provided to the first clutch 5 and the second clutch 7.

Meanwhile, the hydraulic circuit is provided with a plurality of gear actuators 17, each of the gear actuators 17 may switch the shift stage between two shift stages as a slider S moves to both sides thereof, and when the slider S is located on the center thereof, the gear actuator 17 may form a state where neither of the two shift stages is selected.

The gear actuator 17 has the slider S moved by the hydraulic pressure, and the hydraulic pressure for operating the slider S of the gear actuator 17 is supplied by a flow rate control solenoid valve 19 connected to each of the gear actuators 17 and a pressure control solenoid valve 21 supplying the hydraulic pressure to the flow rate control solenoid valve 19.

That is, as illustrated in FIG. 1, one pressure control solenoid valve 21 is provided, and several pairs of the flow rate control solenoid valve 19 and the gear actuator 17 are provided, so that in a state where the line pressure is adjusted to a suitable hydraulic pressure by the pressure control solenoid valve 21 to be supplied to the flow rate control solenoid valve 19, the controller CLR may supply the suitable flow rate to the corresponding gear actuator 17 with one selected flow rate control solenoid valve 19 to perform the shift to a desired shift stage.

Meanwhile, the controller CLR is configured to receive the operation information of a shift lever 23 provided separately to thus switch a shift range.

That is, when a driver switches from a D range implementing a forward shift stage to an N range with the shift lever 23, the controller CLR receives this signal to control so that the sliders S of all the gear actuators 17 become neutral states, and conversely, when the driver switches the shift range to the D range, the controller CLR drives the gear actuator 17 to which the shift stage suitable for the current situation is assigned based on a vehicle speed at that time and a driver's accelerator pedal operation state to perform the shift to the corresponding shift stage.

Referring to FIG. 2, a hydraulic pressure control method for a transmission according to an exemplary embodiment of the present disclosure includes determining whether a shift range is switched (S5). If the shift range is switched (Yes to S5), the method includes confirming whether a current shift range is among a plurality of shift ranges (S10), if the current shift range is a predetermined first range (Yes to S10), setting a dither frequency of the pressure control solenoid valve 21 of the hydraulic circuit for the transmission to a predetermined first frequency (S20), and if the current shift range is a shift range other than the first range (No to S10), setting the dither frequency of the pressure control solenoid valve 21 to a predetermined second frequency (S30).

The first range refers to an N range indicating a neutral state of the transmission, and the first frequency refers to a frequency lower than the second frequency.

That is, embodiments of the present disclosure control to switch the dither frequency of the pressure control solenoid valve 21 to the first frequency lower than the second frequency, if it is confirmed that the current shift range is the N range when confirming the current shift range.

This is to secure the hydraulic control robustness of the transmission by preventing such a phenomenon because if the dither frequency of the pressure control solenoid valve 21 is too high in the N range, pressure vibration is caused by the dither frequency of the pressure control solenoid valve 21, thereby causing the line pressure to vibrate together, so that there may occur a problem in that the control robustness of the hydraulic circuit deteriorates.

Meanwhile, the shift ranges other than the first range may be a D range capable of implementing a forward shift stage of a vehicle, an R range capable of implementing a reverse shift stage, and the like, and the confirming of the current shift range (S10) may be performed when the shift range is switched by the shift lever 23.

That is, when the driver switches the shift lever 23 from the D range to the N range, the confirming of the current shift range (S10) confirms this, decreases the dither frequency of the pressure control solenoid valve 21 from the second frequency to the first frequency, and conversely, when the driver switches the shift lever 23 from the N range to the D range, accordingly, the confirming of the current shift range (S10) increases the dither frequency of the pressure control solenoid valve 21 from the first frequency to the second frequency.

Accordingly, it may also be considered that embodiments of the present disclosure include confirming whether the shift range selected by the operation of the shift lever 23 is an N range, and switching the dither frequency of the pressure control solenoid valve 21 of the transmission to a frequency lower than a frequency in a previous shift range, if the selected shift range is the N range.

The dither frequency has a function of improving the operability by allowing a valve spool of the solenoid valve to be controlled using the dither frequency to operate smoothly, but if the dither frequency is too high, pressure vibration may be caused in the hydraulic circuit as described above, so that embodiments of the present disclosure may change and apply the dither frequency according to the situation, thereby securing the smooth operability of the solenoid valve and preventing the unnecessary pressure vibration of the hydraulic circuit together.

In the case of a wet DCT, since the gear actuator 17 implementing the current shift stage has already completed the shift operation in the D range, it is no longer necessary to supply a flow rate and thus even a relatively low hydraulic pressure is sufficient, so that the pressure control solenoid valve 21 is controlled at a relatively low level of current, but since a relatively high hydraulic pressure is required to drive the gear actuator 17 to perform the shift to a target shift stage to be shifted next in the N range and thus the pressure control solenoid valve 21 is controlled by a relatively high level of current, there may occur a problem of vibrating the line pressure as described above when the high dither frequency is supplied here, so that embodiments of the present disclosure relatively decrease the dither frequency in such an N range, and relatively increase the dither frequency again in the shift ranges other than the N range.

Accordingly, preferably, the first frequency and the second frequency will be appropriately set according to the characteristics of the corresponding hydraulic circuit and solenoid valves based on a number of experiments and analyses according to, for example, the aforementioned purpose.

Meanwhile, the first frequency and the second frequency may be set to different values according to the oil temperatures of the transmission, respectively.

That is, the dither frequency of the pressure control solenoid valve 21 is set to be relatively high as the oil temperature of the transmission is low, so that it would be preferable to secure the smooth operability of the pressure control solenoid valve 21 despite the influence of an increase in oil viscosity due to low temperature.

For reference, FIG. 3 illustrates an example in which the first frequency and the second frequency are set differently according to the oil temperatures, where A1 to A8 refer to the first frequencies according to the respective temperatures, and B1 to B8 refer to the second frequencies according to the respective temperatures.

Although the present disclosure has been illustrated and described in relation to specific exemplary embodiments, it is apparent to those skilled in the art that the present disclosure may be variously improved and changed without departing from the technical spirit of the present disclosure provided by the appended claims.

What is claimed is:

1. A hydraulic pressure control method for a transmission, the method comprising:
   determining whether a current shift range is among a plurality of shift ranges;
   setting a dither frequency of a pressure control solenoid valve of a hydraulic circuit for the transmission to a predetermined first frequency when the current shift range is a first range; and
   setting the dither frequency of the pressure control solenoid valve to a second frequency when the current shift range is a shift range other than the first range.

2. The method according to claim 1, wherein:
   the first range is an N range indicating a neutral state of the transmission; and
   the first frequency is a frequency lower than the second frequency.

3. The method according to claim 2, wherein the first frequency and the second frequency are set to different values according to oil temperatures of the transmission, respectively.

4. The method according to claim 1, wherein determining the current shift range is performed when the shift range is switched by a shift lever.

5. The method according to claim 1, wherein the transmission is a wet dual clutch transmission (DCT) controlling two clutches with hydraulic pressure, and the pressure control solenoid valve receives a line pressure to provide the hydraulic pressure adjusted by a flow rate control solenoid valve for driving a gear actuator of the wet DCT.

6. A hydraulic pressure control method for a transmission, the method comprising:
   determining that a shift range selected by an operation of a shift lever is an N range; and
   in response to determining that the selected shift range is the N range, setting a dither frequency of a pressure control solenoid valve of the transmission to a frequency lower than a frequency in a previous shift range.

7. The method according to claim 6, wherein setting the dither frequency comprises setting the dither frequency to a frequency that is based on an oil temperature of the transmission.

8. A vehicle comprising:
   a transmission;
   a hydraulic circuit for the transmission, the hydraulic circuit having a pressure control solenoid valve; and
   a controller configured to:
      determine whether a current shift range is in a predetermined first range;
      set a dither frequency of the pressure control solenoid valve to a predetermined first frequency when the current shift range is determined to be in the predetermined first range; and
      set the dither frequency of the pressure control solenoid valve to a predetermined second frequency when the current shift range is determined to be in a shift range other than the predetermined first range.

9. The vehicle according to claim 8, wherein:
   the first range is an N range indicating a neutral state of the transmission; and
   the first frequency is a frequency lower than the second frequency.

10. The vehicle according to claim 9, wherein the first frequency and the second frequency are set to different values based on an oil temperature of the transmission.

11. The vehicle according to claim 8, wherein the first range is a D range indicating a forward drive state of the transmission.

12. The vehicle according to claim 8, wherein the first range is an R range indicating a reverse drive state of the transmission.

13. The vehicle according to claim 8, wherein the controller is configured to determine whether the current shift range is in the predetermined first range upon switching to the current shift range.

14. The vehicle according to claim 13, wherein the controller is configured to determine whether the current shift range is in the predetermined first range when the shift range is switched to the current shift range by a shift lever.

15. The vehicle according to claim 8, wherein the transmission is a wet dual clutch transmission (DCT) controlling two clutches with hydraulic pressure.

16. The vehicle according to claim 15, wherein the pressure control solenoid valve receives a line pressure to provide the hydraulic pressure adjusted by a flow rate control solenoid valve for driving a gear actuator of the wet DCT.

* * * * *